INVENTOR.
RICHARD F. JENNINGS
BY Robert M. Krone
ATTORNEY

June 26, 1973 R. F. JENNINGS 3,741,742
METHOD OF AND APPARATUS FOR INTRODUCING AND
CONTROLLING FLOW OF BATCH IN A FURNACE
Filed July 19, 1971 2 Sheets-Sheet 2
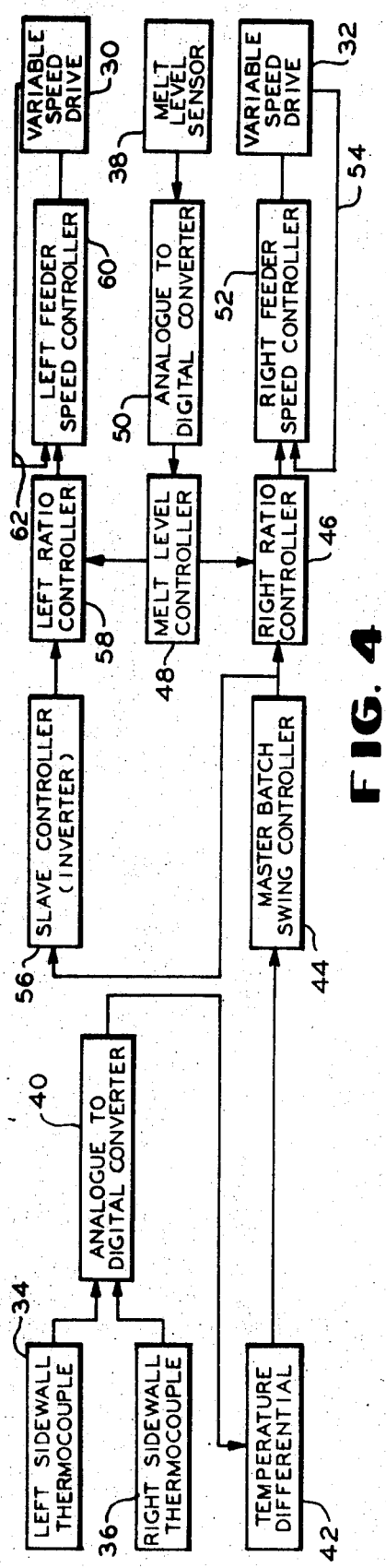
FIG. 4
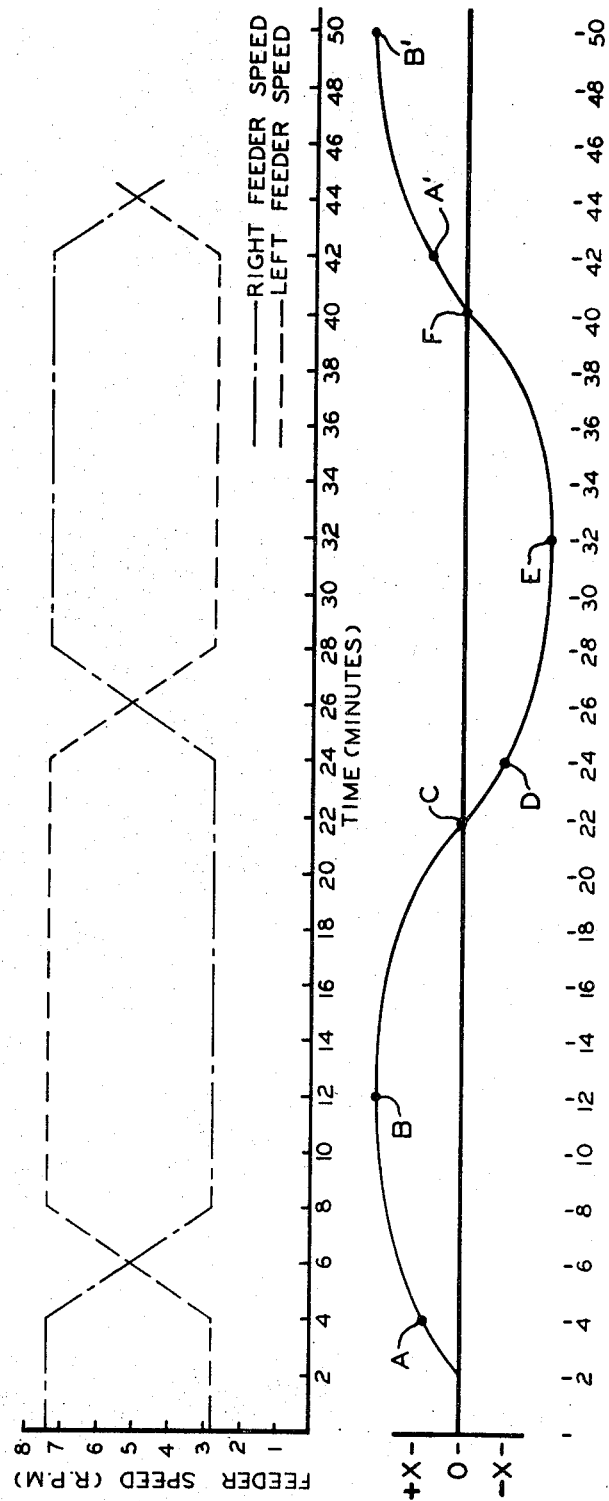
FIG. 5
FIG. 6
INVENTOR.
RICHARD F. JENNINGS
BY Robert M. Krone
ATTORNEY

3,741,742
METHOD OF AND APPARATUS FOR INTRODUCING AND CONTROLLING FLOW OF BATCH IN A FURNACE

Richard Frank Jennings, Vienna, W. Va., assignor to Johns-Manville Corporation, New York, N.Y.
Filed July 19, 1971, Ser. No. 163,867
Int. Cl. C03b 5/24
U.S. Cl. 65—135            19 Claims

ABSTRACT OF THE DISCLOSURE

A method of and apparatus for processing heat softenable, inorganic batch material to maintain a homogenous and a constant temperature mass of material in the melter section of a furnace of the continuous melting type. Batch introduction is directionalized to cause it to move transverse of the longitudinal axis of the furnace from a cooler to a hotter section of the furnace and effectively cool that section. This retards the advance of the batch out of the melting zone toward the refiner and forehearth by tending to enhance circulation in the melt by convection.

BACKGROUND OF THE INVENTION

In the manufacture of glass by the continuous melting process glass batch material is delivered to the melter section of the furnace by means of feeders. The glass batch material is melted in the melter section and is then refined and delivered to a forehearth for utilization in the formation of useful glass product. Typically, the refiner section of the furnace is intermediate the melter and the forehearth section. The forehearth can contain a plurality of spaced orifices for marble forming or alternatively fiber-forming bushings.

Heretofore, it has been found that the batch tended to concentrate in localized areas within the furnace thereby retarding melting, tending to develop variations in composition through the melt and tending to produce hot and cold spots therein.

Some effort to overcome these shortcomings have included blanket feeders which seek to introduce batch over the entire or a substantial portion of the back wall of the furnace and flow directing means such as dams, bubblers and rams or pushers to alter the flow patterns in the furnace. In many instances these prior expedients have met with little or indifferent success.

The quality of the product from continuous melting processes has been found to be a function of the homogeneity of the molten glass which is a function of the homogeneity of the glass batch material as it traverses the melter section of the glass melting furnace. By properly controlling the distribution of the glass batch material within the melter section of the furnace, the glass batch will melt quickly to effectively enlarge the melt area of the furnace. Such distribution control will also tend to enhance the homogeneity of the resultant molten glass and will stabilize the temperature of the glass in the melter section of the furnace to provide the desired accurate glass temperature control of the molten glass reaching the refining and forehearth sections of the furnace. Accurate temperature control and consistency are of paramount importance in forming high quality glass products such as marbles and fibers for use in manufacturing textile fabrics.

SUMMARY OF THE INVENTION

The present invention relates to methods of and apparatus for controlling the flow of materials within glass furnaces.

A particular feature of the invention is the shifting of the batch flow into the melter section of a glass furnace in a predetermined pattern to enhance melting of the batch and mixing of the batch with the molten glass.

An advantageous pattern involves swinging the major body of batch to the left and right of the longitudinal center line of the furnace in a regular cycle. This batch swing is achieved while controlling batch level by correlating the variables of relative feed rates from spaced feeders on opposite sides of the longitudinal center line of the furnace with the total feed rate of the batch from all feeders. One technique set forth below employes paired identical linear batch feeders having speed control which will vary the speed of the feeders proportionally in opposite directions, to achieve batch swing, and vary the speed of both feeders in the same direction proportionally and simultaneously to maintain a desired melt level. The swing control is instituted in response to thermal conditions sensed in localized areas, while melt level is sensed across the forehearth of the furnace.

Computer control of the batch feed is based upon a batch level master setpoint to which the batch level signal is compared. A plus or minus error is acted upon by control equations employing proportional, integral and derivative manipulations so that the feed rate total is adjusted to achieve the setpoint along a correction curve by periodic sampling constrained to a rate which tends to avoid overshoot. The output is cascaded to the setpoints of the individual feeders. Setpoint changes in the feeder controllers induce plus or minus error when set point speeds and current feeder speeds disagree. A master batch swing controller, changing the sign of that output, equations to generate a compensating output signal. A slave feeder controller responds to the master batch feeder controller so that batch swing control results in opposite changes on paired feeders equally spaced on opposite sides of the furnace longitudinal center line.

Batch swing control pushes the batch pile in the furnace from one side to the other in the first section of the melter. A sidewall temperature differential is used as a measurement. Output of the feeders proportionally increases and decreases batch flow input on the respective sides of the furnace center line to cause the batch to flow across the center line toward the hotter side of the furnace. The swing of the batch tends to cool the hotter side whereby, in time, the opposite side of the furnace becomes hotter and the feed rates are automatically reversed so that the preponderance of batch is fed from the now cooler side and that batch develops currents toward the now hotter side and across the furnace center line in a direction intersecting the formerly established flow pattern.

In one example, as viewed from the backwall of the furnace, a differential temperature is ascertained by subtracting the right thermocouple temperature from the left thermocouple temperature. The temperature differential is used by the master batch swing controller as its measurement. The measurement is compared to a setpoint and, when an error of a given level is sensed, the error is acted on by control equations to generate an output. The tuning constants in the control equations induce over-shoot as the output ramps to output high or low for the right side feeder controller directly controlled by the master batch swing controller, depending on the sign of the error as plus or minus. The output of this loop goes to a ratio algorithm. The ratio algorithm biases the cascaded setpoint point to the right batch feeder controller as a result of the melt level setpoint. A slave controller provides control of the left batch feeder controller by a proportional algorithm reading the output of the master batch swing controller, changing the sign of that output and sending the changed sign output to a ratio algorithm. The ratio algorithm biases the cascaded setpoint of the melt level going to the left batch feeder controller in the same proportion, but in a reverse direction to the bias given to the right batch feeder controller. As a result, the total batch feed rate is not altered during batch swing control and remains responsive to melt level corrective signals even during the transitions of batch swing control. The master setpoint of the batch swing controller can be changed to insure that equal amounts of batch are pushed to both sides during a batch swing cycle.

The swing cycle illustrated employs a straight ramp of feeder speed with time during transitions for swing control whereby a transition takes place over a relatively short interval as by interchanging feed rates to shift the right feeder from minimum to maximum speed while the left feeder is shifted from maximum to minimum speed. After each transition, the relative feed rates are maintained for relatively long intervals and until the threshold temperature differential for instituting a new transition is sensed.

In accordance with the present invention, the glass batch material is conveyed and fed into the melter section of the glass melting furnace at an angle to the longitudinal axis of the furnace through at least two spaced apart feeder systems. The feeder systems may include auger-type feeders having their exit ends in communication with the melter section of the furnace near the back wall thereof. In one such arrangement, the feeders feed through the back wall and are oriented to discharge the glass batch material at approximately a 45° angle to the longitudinal axis of the furnace. Another approach is to place the feeders in the side wall oriented to discharge the batch generally perpendicular to the longitudinal axis of the furnace. Control of the feed rate of the feeders is achieved by the control of associated drives for the screw conveyors. In a specific example of a system employing the invention, a differential of about 2.5:1 is employed between the maximum and minimum speed of the feeders. The desired differential is controlled by a tachometer on each feeder coupled through a servo loop to the feeder drive. A level sensing device is employed in the system, typically disposed in the forehearth section, to effect the control of the total glass batch input to the furnace by control of the total batch feed rate from the two feeders. Adjustments in total feed rate can be made while the proportion of feed from each feeder is controlled.

Temperature sensing devices are disposed in the furnace to sense the temperature of the batch-melt mixture adjacent the side walls preferably in the melter section downstream of the feeder discharge and above the level of the glass batch being melted, for example, in the breastwall or arch of the furnace. In operation, when one of the feeders delivers the glass batch at a high rate, while the second feeder delivers glass batch at a relatively lower rate, a flow of glass batch is experienced toward the furnace wall through which the second feeder discharges and thence back toward the rear of the furnace. Such a flow pattern causes a drop in the temperature sensed by the temperature sensing device located on the side of the furnace containing the second feeder.

A thermal control loop, set with a predetermined differential, is effective to sense the drop of the temperature of the zone in the region of one furnace wall relative to the other to a certain level, at which time a transition is initiated in the feeding rate such that the second feeder will increase its feeding rate linearly with respect to time, in a proportion to maintain the entire feed rate constant thereby assuring a constant and uniform input of glass batch material into the furnace.

The net effect of the glass batch technique utilizing the coordinated feed rates from opposite sides of the furnace effectively enhance glass efficiencies. This is believed to result from the production of a more homogeneous mix of batch being melted within the melter section, a resultant more homogeneous molten glass, and a more constant temperature at the throat of the furnace such that the product has more accurately defined end uniform softening point, density, and flow characteristics.

BRIEF DESCRIPTION OF THE DRAWINGS

The above, as well as other objects and advantages of the invention, will become apparent to those skilled in the art from reading the following detailed description of an embodiment of the invention when considered in the light of the accompanying drawings, in which:

FIG. 4 is a schematic illustration of a control system for achieving the feed control causing the desired swing of the batch feed as illustrated in FIGS. 1, 2, and 3;

FIG. 5 is a plot against time of a typical batch swing cycle in terms of feeder speeds for a system employing two feeders; and FIG. 6 is a plot against time of a typical sidewall temperature differential experienced with the cycle of FIG. 5.

DESCRIPTION OF THE PREFERRED EMBODIMENT

Figure 1:
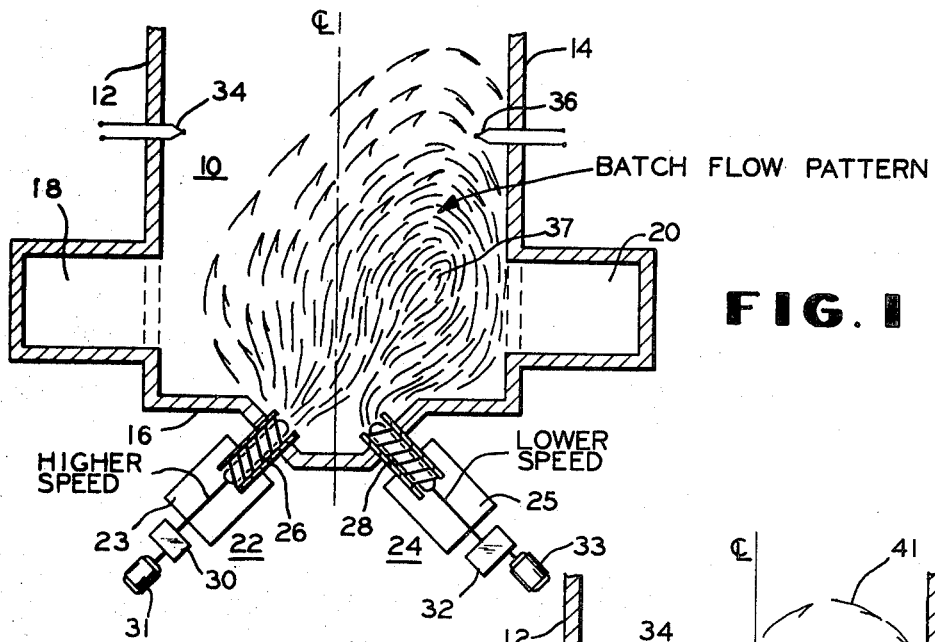
FIG. 1 is a plan view of a portion of a continuous glass melting furnace diagrammatically illustrating the feed of glass batch material toward one side of the melter section of the furnace.
Figure 2:
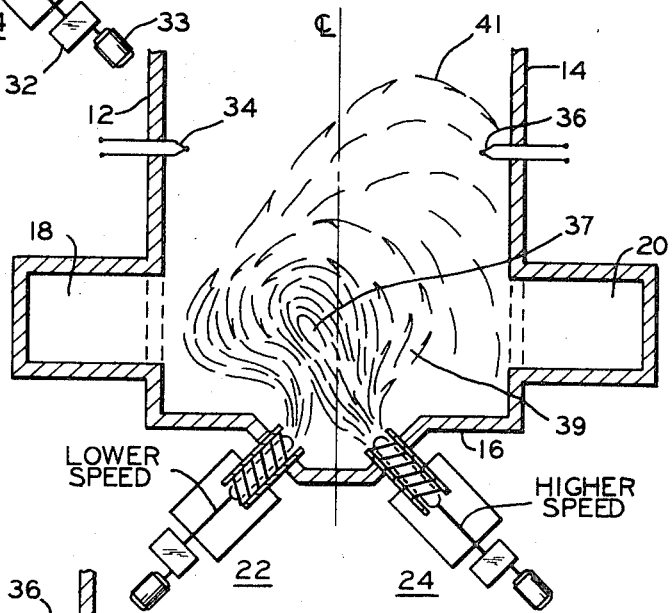
FIG. 2 is a plan view similar to FIG. 1 diagrammatically illustrating the feed of glass batch material in an intermediate position in its swing toward the opposite side of the melter section of the furnace.
Figure 3:
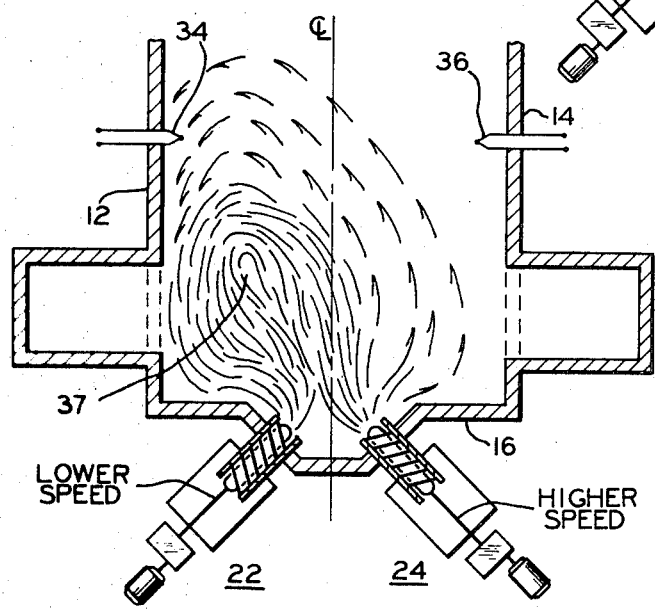
FIG. 3 is a plan view similar to FIGS. 1 and 2 diagrammatically illustrating the feed of glass batch material after a complete swing to the side of the melter section of the furnace opposite to that illustrated in FIG. 1.

Referring to the drawings, and particularly FIGS. 1 to 3 inclusive, there is diagrammatically illustrated the batch swing technique of the invention. More specifically, there is illustrated a portion of a continuous melt furnace which includes a melter section generally indicated by reference numeral 10 having side walls 12 and 14, and a back wall 16 preferably constructed of refractory material to withstand the deleterious effects of the high temperatures necessary to effect the melting of the glass batch material.

Suitably disposed within the furnace are a plurality of burners, not shown, for introducing the desired heat energy to the interior of the furnace to achieve the melting of the glass batch. Exhaust gases from the furnace may be removed through suitably disposed stacks 18 and 20.

Located at the end wall 16 of the melting section of furnace there are two spaced apart glass batch feeders 22 and 24 for feeding glass batch material which is typically comprised of a granular mxture of the constituents necessary for producing the desired glass product. The feeders 22 and 24 are in communication with a suitable reservoir of the glass batch material through hoppers 23 and 25. The glass batch material is conveyed or moved from the reservoir to the interior of the melter section 10 by any suitable conveying means; for example, auger-type conveyors 26 and 28 in the respective feeders 22 and 24.

Each of the auger-type conveyors 26 and 28 of the feeders 22 and 24, respectively is provided with a variable speed drive 30 and 32 which may be a pneumatically controlled variable speed gearing to control the rate of feed of glass batch into the melter section 10. Electric drive motors 31 and 32 of the constant speed type drive variable speed gearing 30 and 32. Pneumatic valve controls for drives 30 and 32 are coupled to a control circuit as illustrated in FIG. 4 to be described in detail hereinafter.

In order to militate against the tendency of the batch material being fed into the furnace by the feeders 22 and 24 from building up or becoming concentrated at a fixed location in the melter section 10 and to simultaneously control the level of the molten glass in the furnace, the control system for automatically controlling the relative feeding rates of the feeders as illustrated in FIG. 4 considers as independent controlling variables melt level and batch-melt temperature in the melter section into which batch is introduced. More specifically, the build-up of glass batch material in the melter section 10 of the furnace is sensed as a function of temperature which signal is employed effectively to control the relative feed rates of the feeders 22 and 24. Temperature sensing devices 34 and 36, such as for example, thermocouples, are disposed in temperature sensing relation to the interior of the melter section 10 on or near the side walls 12 and 14 as on the breastwall or arch of the furnace, respectively. While the temperature measurements within the melter section 10 of the furnace function to control the speeds of the feeders 22 and 24 to effectively swing the batch from one side of the melter section 10 to the other, the total quantity of glass batch being fed into the furnace is a function of the molten glass level which is typically sensed in the forehearth section of the furnace by a level sensing device 38 (FIG. 4). The level sensing device 38 may be of a variety of types which are capable of producing an electrical signal proportional to the level of the molten glass. It has been found that a radioactive type level sensing device employing a cobalt 60 source (not shown) positioned across the forehearth (not shown) from a gamma ray detector 38 produces a suitable signal which can be calibrated as an analogue indication of the level of the melt.

According to this invention the batch, which is in the form of a blend of finely divided particles of the composition to form the formulation desired, is fed into the furnace continuously and swung from side to side across the center line of the furnace by adjusting the relative feed rates of feeders oriented to push the batch pile into the batch melt mixture in the furnace melter section. Sequences for one-half a batch swing cycle are illustrated in FIGS. 1, 2, and 3. Beginning with the left feeder 22 operating at a higher rate, the right feeder 24 at a lower rate and the batch flow pattern swung to the right so that the center of the batch pile 37 is on the right side of the furnace 10, the pattern is generally clockwise as viewed in FIG. 1. The slower feed of the batch from feeder 24 is picked up and entrained with the faster fed batch from feeder 22 in this clockwise pattern. A substantial thermal inertia exists in the furnace, however, after a time the batch concentration on the right begins to lower the temperature in the vicinity of thermocouple 36 while the hotter melt which accumulates on the left raises the temperature of thermocouple 34. This thermal differential transition begins slowly but accelerates to a relatively high speed as it crosses the zero differential level and achieves the opposite sign threshold level to shift the feeder speeds.

FIG. 2 shows the effect on the batch flow pattern of feeder 24 at the higher speed and feeder 22 at the lower speed a sufficient interval following completion of the speed transitions to permit the center 37 of the batch pile to swing past the furnace longitudinal center line toward the left wall. At this time the circulation of the batch is beginning to reverse to a counter-clockwise flow, particularly in the region 39 near the back wall 16, since feeder 24 provides the preponderant impetus to the batch. However, the batch more remote from wall 16, as in region 41 is continuing its clockwise flow, with the result that mixing is enhanced.

FIG. 3 shows the batch pattern at a later point in time than FIG. 2, but with feeder 24 sustaining the higher feed rate. At this time, the entire flow is shown as counter-clockwise and the center 37 of the batch pile is approaching wall 12. This condition maintains until the temperature differential reaches its opposite threshold by the cooling of 34 and heating of 36. Thereafter the feed rate transition is reversed and the batch swung toward the right wall to again achieve the condition of FIG. 1.

The control system illustrated in FIG. 4 includes temperature sensing devices 34 and 36. The device 34 measures the temperature near the left side wall 12 of the melter section 10 and the device 36 measures the temperature near the right side wall 14 of the melter section 10. The sensing devices 34 and 36 each issue analogoue temperature signals as voltages in the millivolt range. An eight second sample time has been employed to achieve an accurate up-date from the side wall thermocouples 34 and 36. These signals are converted to digital signals for computer manipulation by analogue to digital converter 40. This first signal manipulation is a weighted sum calculation algorithm whereby the thermocouples 34 and 36 are calibrated for computation purposes. A differential temperature between the thermocouples is ascertained and employed as a means of establishing the appropriate time to institute a change in relative feed rates as represented at 42.

Master batch swing controller 44 responds to the output of variable 42 at positive and negative thresholds or limits of indicated side wall temperature differential to issue a ramp signal, one that changes linearly with time. This ramp signal represents a percentage of an otherwise established level and is employed in a ratio controller in cascade with a feed rate setpoint correlated to melt level as indicated by melt level sensor 38. Extremely small proportional ($K_P$) and large integral ($K_I$) tuning constants are utilized in the algorithm of the form $$\text{output} = K_p e + K_1 \Sigma edt$$

where $e$ is the error, to insure over-shoot in batch swing. The output of the master ramps to the output high, if the differential error is positive, and to output low, if the differential error is negative. Both feeder drives 30 and 32 are controlled by master batch swing controller. The right drive is controlled directly by a percentage signal to the setpoint established in right ratio controller 46 so that the output of controller 44 is cascaded with the setpoint of melt level controller 48 as represented by the digital value of melt level established by analogue to digital converter 50 coupling melt level sensor 38 to melt level controller 48. The output of controller 46 controls a proportional plus integral algorithm included in a closed loop control 52 for the each batch feeder variable speed drive 32 an a tachometer developed speed feed back on path 54.

The left feeder control is by a similar combination where the output of the master batch swing controller 44 is inverted in slave controller 56 and applied as a percentage of change. This results in the generation of the complement of right feeder speed control for the left feeder speed control by changing the established speed feed of each the same percentage but of opposite algebraic signs. Left ratio controller 58 cascades the percentage feed signal from controller 56 with the setpoint or melt level feed speed percentage from melt level controller 48 to issue a pattern signal to the left feeder speed controller 60. The resultant speed signal in controller 60 is summed with a speed feed back signal from drive 30 on feed back path 62 to provide a servo loop control of the left feeder speed.

As shown in FIGS. 5 and 6 where other variables such as melt level and heat are unchanged, a cyclic plot of the feeder speeds can be correlated to the temperature differential between the right and left walls expressed as the right wall temperature signal less the left wall temperature signal. In practice, one furnace has operated with a significantly increased glass efficiency where the feeders operate between 7.35 r.p.m. and 2.9 r.p.m. as represented in FIG. 5. In that furnace the batch swing cycle has been about forty minutes with about a four minute transition interval in transposing the respective feed rates linearly between maximum and minimum and about a sixteen minute interval at each established maximum-minimum feed rate condition for the opposed feeders.

As shown in the plot of differential temperatures of FIG. 6, two thresholds are employed, a positive differential, +$x$, and a negative differential, −$x$. In the illustration a balanced temperature characteristic and batch swing is represented hence the thresholds are of equal absolute values. At these thresholds, represented by the intersection of the plot of temperature differential with the straight lines +$x$ and −$x$ paralleling the time axis of the plot, the master batch swing controller 44 initiates a feed rate transition. While the curve of temperature differential is generally of sine form, it will be noted that there is a substantial time offset from the batch swing and a distortion from a true sine form due to the thermal lag in the furnace. Thus the temperature differential will continue to increase beyond the threshold intersection at A for a substantial interval after the feed rate toward the hotter side (the right side for a positive differential in the example) has been set at its maximum. The maximum differential B is shown four minutes after the shift of feeder speeds has been completed. Thereafter there is a gradual cooling at an increasing rate so that zero differential occurs at C only two minutes before the opposite threshold level D is reached to initiate the batch swing to the opposite side. Again, an overshoot and a lag is experienced until the differential achieves its maximum at E and gradually increases its rate of return toward zero at F and the opposite sign threshold at A' to initiate a new cycle.

With the left and right side wall thermocouple temperatures in zone 1 of the melter converted to digital signals for computer manipulation a weighted sum calculation is applied to the signals with weighting factors determined empirically by observation of the melt and the swing of the batch therein. The objective here is to establish a balance of batch swing so the swing is to equal extremes on either side of the furnace longitudinal center line. This may be a function of the thermal characteristics of the furnace or the surroundings. For example, if the left wall is adjacent an exterior wall of the building housing the furnace and the right wall is adjacent another furnace, heat loss is greater at the left wall and some compensation in thermocouple signals is required if those signals are to represent like batch swings. Thus the left wall temperature signal might be ten percent below the right wall temperature signal and require weighting as by a five percent positive weighting on the left wall signal and a five percent negative weighting on the right wall signal.

In a furnace having like thermal characteristics on both sides of zone 1 a weighting factor of one is applied to each of the left and right temperature signals.

The temperature signals, weighted if necessary, are subtracted to provide a temperature differential as right side less left side temperature. This differential is the input to the master batch swing controller 44. A proportional plus integral algorithm is employed in controller 44.

Controller 44 tends to maintain a percentage signal as an output during the quiescent run of the feeders at respective maximum and minimum feed rates. During transitions a sampling of the percent of output is made periodically while that output is varied to achieve the shift from minimum to maximum on one feeder while shifting from maximum to minimum on the other. A narrow range of deviation is permitted from the optimum straight line curve of percent of output during this transition with a new setpoint being established for each sampling which indicates a signal changed beyond the permissible range of deviation. In this self-correcting manner, the plot of percent of output is shifted along what approaches a straight line between the minimum and maximum outputs.

The output of the master batch swing controller as a percent of output is employed as the cascaded setpoint for the ratio controller for the right side while its negative value is employed as the cascaded setpoint for the ratio controller for the left side after it is changed in algebraic sign in slave controller 56. In this manner a 10% increase from master controller 44 causes a 10% increase in the right ratio controller 46 and a 10% decrease in the left ratio controller 58. Conversely, a decrease of output for the master controller 44 causes an equal increase in the output from the slave controller 56 whereby the sum of the rates of output of the two feeders is maintained constant.

The ratio controllers are responsive to both the melt level and the batch swing control percentage of output to issue a drive speed control signal representing the total feed rate required and the relative feed rates which afford batch swing control. Thus, the melt level controller normally establishes a relatively fixed rate of batch feed to equalized batch input against losses and the glass drawn off for useful product. When a change occurs, as where the number of marble orifices (not shown) or filament bushings (not shown) which are effective in the forehearth is changed, melt level correction or maintenance is by a proportional plus integral plus derivative algorithm. That is a linear correction signal is issued with periodic checks to ascertain the degree of deviation from the ideal correction pattern. When the deviation exceeds the limits set, readjustment of the correction signal is made by establishing a new setpoint which places the signal level within the acceptable range. Readjustment of the setpoint is subject to a further constraint of rate of change. This minimizes the tendency to overshoot as would result from an excessively rapid readjustment of the melt level factor.

The output of melt level control 48 is reverse acting so that it maintains the melt within upper and lower limits and near an optimum level. Its signal is the measurement upon which both the left and right ratio controllers 58 and 46 operate wherein the output of melt level controller 48 is cascaded to the setpoint of the respective batch feeder controls. The respective ratio controllers each employ the output of their master or slave batch swing controller cascaded to the ratio controllers setpoints to give a proportional minus bias to the output of the variable for a positive setpoint and a positive bias to the output for a negative setpoint. As a result, the melt level is combined with percent output dictated by the temperature differential achieving a threshold level to cause a pattern of drive speed for the feeders to produce the forms of FIG. 5. Such pattern results in a speed control by conventional feedback signal and suitable compensation for stability and the desired response speed.

As a result or the batch swing moving thermal gradients are developed across the surface of the melt in a manner tending to create convection currents through the depth of the melt. The resultant circulation of batch and melt reards the tendency of the batch to pass to the refiner and forehearth before it has entered into the melt as a homogeneous part thereof.

The control for instituting feed rate transitions lends itself to other controlling functions. For example, a time based cycle can be developed empirically such that the transition is instituted on a regular time base. The transition can also be instituted on a combination of a thermal and time basis as by a correlation of time and temperature such that a first given temperature differential occurring a first given time interval following a transition of feed rates will initiate a reverse transition of those rates whereas a failure to achieve that first given temperature at that first time maintains the current feed until another time-temperature differential relationship is established or a predetermined time limit is reached.

It is to be understood that other forms of controllers might be substituted for those described above and that the advanges of swinging the batch transversely of the longitudinal axis of the furnace could be accomplished by sensing means other than the thermocouples described such as by visual inspection of the melt or optical pyrometer measurements. While the method and apparatus are illustrated for glass processing, it is to be understood that it is applicable to other inorganic thermoplastic materials. In response to the critical positioning of the batch, batch shifting could be controlled by other feed control mechanisms or even manually adjusted controls to alter relative feed rates or even introduce new feeds provided the total input rate was controlled as required. Accordingly, the above detailed description is to be read as illustrative of the invention and not in a restrictive sense.

I claim:

1. A method of processing inorganic thermoplastic material including the steps of feeding batch material into a melting chamber adjacent one end thereof; applying heat to the chamber to melt the batch material in the chamber; sensing the temperature of side regions of the chamber spaced from the end wall; and controlling the direction of feed of the batch material into the chamber to effect a net flow of batch material which swings from side to side of the chamber with the direction of feed being responsive to the temperature of the side regions to effect a net flow of the batch material toward the side region having the higher temperature.

2. A method according to claim 1 including the step of supplying batch material to be fed to the melting chamber in the form of a blend of finely divided solid constituents for the inorganic thermoplastic material.

3. A method according to claim 1 wherein the feeding of the batch is from at least two spaced regions of the melting chamber; and wherein the flow direction control includes controlling the relative rates of feed of the batch from the two spaced regions.

4. A method according to claim 3 wherein the two spaced regions are on opposite sides of a longitudinal center line of the melting chamber extending from the one end thereof.

5. A method according to claim 4 wherein the feed rates are changed in opposing directions during transitions in feed rate.

6. A method according to claim 4 wherein the feed rates are controlled to a first condition wherein the feed from a first region is at a high rate and the feed from a second region is at a low rate, to a second condition whereing the feed from the first region is at a low rate and the feed from the second region is at a high rate, and to transition conditions between said first and second conditions wherein the feed rates from the first and second regions are changed in opposing directions simultaneously.

7. A method according to claim 1 including the steps of withdrawing melted inorganic thermoplastic material from said melting chamber; and controlling the feed rate of batch material to maintain a given level of melted material.

8. A method according to claim 7 including the steps of monitoring the level of melted material present; and controlling the feed rate of batch material in response to the monitored level.

9. A method according to claim 3 including the steps of withdrawing melted inorganic thermoplastic material from said melting chamber; and controlling the total feed rate of batch material to the chamber to maintain a given level of melted material.

10. A method according to claim 4 wherein said two regions are equally spaced from said center line and including the step of directing batch issued from said two regions along paths having equal angular relationships to said center line.

11. A method according to claim 3 wherein flow directing changes in feed rate from the two spaced regions are of equal amounts and opposite sign.

12. A method of continuously melting glass which comprises introducing finely divided, solid particles of glass batch into a furnace melting zone at paired feed regions on opposite sides of a longiutdinal center line of the zone; directing said batch from each feed region of a pair along a path to subtend opposite equal angles with the longitudinal center line of the zone; sensing the temperature of the melting zone in locations on opposed sides of the center line and spaced from said feed regions toward the glass withdrawal region of the furnace; and controlling the rates of feed of batch from the feed regions to effect a net flow of batch toward the location having the higher temperature.

13. A method according to claim 12 wherein feed paths are toward the center line and wherein the rate of feed is greatest from that region which is on the opposite side of the center line from the location having the higher temperature.

14. Apparatus for processing inorganic thermoplastic material comprising a furnace; a melting zone in said furnace; a batch feeder means comprising a plurality of spaced apart feeders for feeding inorganic thermoplastic batch material into said melting zone; means for applying heat to said furnace to melt the batch material; batch directing means to direct a net flow of the batch from said feeder means from side to side of said melting zone whereby the mix of said batch material with melted thermoplastic material is improved with said batch directing means including means to adjust the relative rates of feed of said feeders; means to sense the temperature at localized portions of said melting zone; and means responsive to said temperature sensing means to actuate said batch directing means whereby a net flow of batch is directed toward a portion of said zone of higher temperature.

15. A method of processing inorganic thermoplastic material including the steps of feeding batch material into a melting chamber adjacent one end thereof; applying heat to the chamber to melt the batch material in the chamber; sensing a temperature differential between a first portion of said chamber and a second portion of said chamber; and controlling the direction of feed of the batch material into the chamber to effect a net flow of batch material which swings from side to side of the chamber with a shift in the direction of feed being instituted in response to a sensed temperature differential of a predetermined amount.

16. An apparatus for processing inorganic thermoplastic material comprising a furnace; a melting zone in said furnace, said melting zone having a longitudinal centerline; a batch feeder means for feeding inorganic thermoplastic batch material into said melting zone; means for applying heat to said furnace to melt the batch material; means to sense the temperature at localized portions of said melting zone on opposite sides of said centerline; means to detect a temperature differential between said sensed temperatures; directing means to direct a net flow of the batch material from said feeder means from side to side of said melting zone; and means responsive to a given detected temperature differential to actuate said directing means to direct a net flow of said batch material toward the higher temperature portion of said melting zone.

17. Apparatus according to claim 16 wherein said feeder means comprises paired, spaced apart feeders on opposite sides of said center line and oriented to direct batch toward said center line; and said means to direct batch includes means controlling the rate of feed of said feeders.

18. Apparatus according to claim 17 including a first feeder control for changing the rate of feed of one of said feeders in a first direction in a given pattern; and a feeder control for changing the rate of feed of the other

11 of said feeders paired with said one feeder in a second direction in a second given pattern in response to said first feeder control.

19. Apparatus according to claim 17 including means to sense the temperature at localized portions of said melting zone on opposite sides of said center line; means responsive to said temperature sensing means to establish a temperature differential between said sensed temperatures; and means responsive to a given temperature differential to actuate said first feeder control to change the rate of feed of said one feeder.

12

References Cited

UNITED STATES PATENTS

| | | | |
|---|---|---|---|
| 2,565,136 | 8/1951 | Kretzmer, Jr. | 65—160 X |
| 3,127,033 | 3/1964 | Lyle | 65—335 X |
| 3,573,017 | 3/1971 | Griem, Jr. | 65—136 X |
| 3,600,149 | 8/1971 | Chen et al. | 65—162 |

ARTHUR D. KELLOGG, Primary Examiner

U.S. Cl. X.R.

65—162, 335